(12) United States Patent
Yuan et al.

(10) Patent No.: US 7,995,683 B2
(45) Date of Patent: Aug. 9, 2011

(54) NOISE FLOOR INDEPENDENT DELAY-LOCKED LOOP DISCRIMINATOR

(75) Inventors: Xiang Yuan, Chandler, AZ (US); Gang Xie, Fullerton, CA (US)

(73) Assignee: SiRF Technology Inc., San Jose, CA (US)

( * ) Notice: Subject to any disclaimer, the term of this patent is extended or adjusted under 35 U.S.C. 154(b) by 174 days.

(21) Appl. No.: 11/923,500

(22) Filed: Oct. 24, 2007

(65) Prior Publication Data

US 2009/0110134 A1      Apr. 30, 2009

(51) Int. Cl.
*H03D 1/00*     (2006.01)

(52) U.S. Cl. .......................... 375/343; 375/371; 375/354

(58) Field of Classification Search .................. 375/343, 375/371, 354; 370/320, 335, 342, 441, 479, 370/515; 708/300, 422, 813, 819; 714/12
See application file for complete search history.

(56) References Cited

U.S. PATENT DOCUMENTS

| | | | |
|---|---|---|---|
| 5,640,416 A * | 6/1997 | Chalmers | 375/147 |
| 5,663,734 A | 9/1997 | Krasner | |
| 5,663,735 A | 9/1997 | Eshenbach | |
| 5,781,156 A | 7/1998 | Krasner | |
| 5,812,087 A | 9/1998 | Krasner | |
| 5,825,327 A | 10/1998 | Krasner | |
| 5,831,574 A | 11/1998 | Krasner | |
| 5,841,396 A | 11/1998 | Krasner | |
| 5,874,914 A | 2/1999 | Krasner | |
| 5,884,214 A | 3/1999 | Krasner | |
| 5,945,944 A | 8/1999 | Krasner | |
| 5,999,124 A | 12/1999 | Sheynblat | |
| 6,002,363 A | 12/1999 | Krasner | |
| 6,016,119 A | 1/2000 | Krasner | |
| 6,052,081 A | 4/2000 | Krasner | |
| 6,061,018 A | 5/2000 | Sheynblat | |
| 6,064,336 A | 5/2000 | Krasner | |
| 6,104,338 A | 8/2000 | Krasner | |
| 6,104,340 A | 8/2000 | Krasner | |
| 6,107,960 A | 8/2000 | Krasner | |
| 6,111,540 A | 8/2000 | Krasner | |
| 6,131,067 A | 10/2000 | Girerd | |

(Continued)

FOREIGN PATENT DOCUMENTS

EP      0 552 975      7/1993

(Continued)

OTHER PUBLICATIONS

Marketing Material: Qualcomm CDMA Technologies—Integrated Solutions—MGP6200™ Multimode GPS Processor (8 pages).

(Continued)

*Primary Examiner* — Shuwang Liu
*Assistant Examiner* — Helene Tayong
(74) *Attorney, Agent, or Firm* — RatnerPrestia

(57) ABSTRACT

A system and method for providing code tracking in a CDMA based communications receiver. In example systems and methods, a CDMA receiver, such as a GPS receiver, receives a signal and demodulates the signal to yield a digital IF signal. The digital IF signal is down-converted to a received code signal. Early, prompt and late correlation results are determined by correlating the received code signal with early, prompt and late duplicates of the received code signal. The early, prompt and late correlation results are used to calculate a code phase error using a noise-floor independent function of all three correlation results.

20 Claims, 11 Drawing Sheets

U.S. PATENT DOCUMENTS

| | | | |
|---|---|---|---|
| 6,133,871 | A | 10/2000 | Krasner |
| 6,133,873 | A | 10/2000 | Krasner |
| 6,133,874 | A | 10/2000 | Krasner |
| 6,150,980 | A | 11/2000 | Krasner |
| 6,185,427 | B1 | 2/2001 | Krasner |
| 6,201,828 | B1 * | 3/2001 | El-Tarhuni et al. ........... 375/150 |
| 6,208,290 | B1 | 3/2001 | Krasner |
| 6,208,291 | B1 | 3/2001 | Krasner |
| 6,215,441 | B1 | 4/2001 | Moeglein |
| 6,215,442 | B1 | 4/2001 | Sheynblat |
| 6,236,354 | B1 | 5/2001 | Krasner |
| 6,239,742 | B1 | 5/2001 | Krasner |
| 6,259,399 | B1 | 7/2001 | Krasner |
| 6,272,430 | B1 | 8/2001 | Krasner |
| 6,289,041 | B1 | 9/2001 | Krasner |
| 6,307,504 | B1 | 10/2001 | Sheynblat |
| 6,313,786 | B1 | 11/2001 | Sheynblat |
| 6,314,308 | B1 | 11/2001 | Sheynblat |
| 6,332,008 | B1 * | 12/2001 | Giallorenzi et al. .......... 375/356 |
| 6,377,209 | B1 | 4/2002 | Krasner |
| 6,408,196 | B2 | 6/2002 | Sheynblat |
| 6,411,254 | B1 | 6/2002 | Moeglein |
| 6,411,892 | B1 | 6/2002 | Van Diggelen |
| 6,417,801 | B1 | 7/2002 | Van Diggelen |
| 6,421,002 | B2 | 7/2002 | Krasner |
| 6,429,814 | B1 | 8/2002 | Van Diggelen et al. |
| 6,433,731 | B1 | 8/2002 | Sheynblat |
| 6,453,237 | B1 | 9/2002 | Fuchs et al. |
| 6,484,097 | B2 | 11/2002 | Fuchs et al. |
| 6,487,499 | B1 | 11/2002 | Fuchs et al. |
| 6,510,387 | B2 | 1/2003 | Fuchs et al. |
| 6,542,821 | B2 | 4/2003 | Krasner |
| 6,583,757 | B2 | 6/2003 | Krasner |
| 6,597,311 | B2 | 7/2003 | Sheynblat |
| 6,614,834 | B1 * | 9/2003 | Meng et al. ................... 375/149 |
| 6,931,056 | B2 * | 8/2005 | Goodings ..................... 375/150 |
| 7,190,709 | B2 * | 3/2007 | Eckhardt et al. .............. 375/145 |
| 2002/0186794 | A1 | 12/2002 | Oesch et al. |
| 2004/0240530 | A1 * | 12/2004 | Schweikert et al. .......... 375/148 |
| 2005/0265494 | A1 * | 12/2005 | Goodings ..................... 375/343 |
| 2006/0215739 | A1 * | 9/2006 | Williamson et al. .......... 375/149 |
| 2007/0201537 | A1 * | 8/2007 | De Wilde et al. ............. 375/147 |

FOREIGN PATENT DOCUMENTS

| | | |
|---|---|---|
| WO | WO01/40821 | 6/2001 |
| WO | WO01/89108 | 11/2001 |

OTHER PUBLICATIONS

Marketing Material: uNav Microelectronics—uN9x18 Low Power, High Performance GPS Receiver Chipset/uN9x18 GPS Receiver Solution (9 pages).

Marketing Material: uNav Microelectronics, uN9x18 Low Power, High Performance GPS Receiver Chipset (2 pages).

Marketing Material: Global Locate—Hammerhead II™, Single Chip AGPS Solution (2 pages).

Marketing Material/Press Release: Broadcom Introduces Advanced Single-Chip GPS Solution for Mobile Applications (3 pages).

Marketing Material/White Paper: SnapTrack: A Qualcomm Company—SnapTrack's Wireless Assisted GPS™ (A-GPS) Solution Provides the Industry's Best Location System—Location Technologies for GSM, GPRS and WCDMA Networks (Qualcomm CDMA Technologies: Enabling the Future of Communications) (4 pages).

* cited by examiner

NOISE FLOOR INDEPENDENT DELAY-LOCKED LOOP DISCRIMINATOR

BACKGROUND OF THE INVENTION

1. Field of the Invention

The invention relates generally to delay-lock loop (DLL) circuits, and in particular, to the DLL discriminator function in Code Division Multiple Access (CDMA) communications systems receivers.

2. Description of Related Art

Global Positioning Navigation (GPS) is a satellite based navigation system having a space segment of a constellation of about 24 GPS satellites. Each satellite broadcasts ranging signals and navigation data on two frequencies. For non-military Standard Positioning Service (SPS) operation modes, GPS signals are broadcast on a carrier frequency L1. (1575.42 MHz) modulated by navigation data and course/acquisition (C/A) code. Navigation data contains orbit information about the satellite that may be used to compute the satellite's position and velocity by a GPS receiver. GPS is a Code Division Multiple Access (CDMA) system and, therefore, uses C/A codes as pseudorandom number (PRN) codes to identify a particular satellite's signals, even though different satellites share the same L1 frequency band. After obtaining GPS range measurements from at least four satellites, the GPS receiver can solve for four unknowns, including its 3-dimensional position and time.

In a typical GPS receiver, a GPS antenna receives signals from all visible GPS satellites. The signals are filtered, amplified, down-converted, and digitized by the receiver's radio frequency (RF) front end. The RF front end sends its output, i.e., digital intermediate frequency (IF) signals to the receiver's baseband digital signal processing (DSP) unit. The DSP unit processes each individual satellite's signals in different channels. One channel is responsible for acquiring and tracking a satellite, demodulating navigation data, and delivering GPS measurements. All channels send their measurements of all visible satellites to a positioning and navigation unit, which finally computes the user receiver's position and time.

In each receiver channel, tracking loops are used to track received satellite signals. Receiver tracking loops consist of a carrier tracking loop which tracks the received carrier and a code tracking loop which tracks the received C/A code. A code tracking loop may be implemented using a delay lock loop (DLL). Delay-lock loops include a DLL discriminator function to calculate code phase tracking error. However, code phase error results using some well-known DLL discriminator functions, such as early-minus-late (EML) method, are dependent on an estimation of the noise floor, which becomes more critical for the case of tracking weak signals. If the noise floor cannot be accurately estimated, the resulting range measurements will also be inaccurate.

It would be desirable to implement a DLL discriminator that is not dependent on any noise floor estimation.

SUMMARY

In view of the above, systems and methods are provided for determining code phase errors using delay lock loop implementing a noise-floor independent discriminator. In a first aspect of the invention, an example method is provided for determining a phase error of a received communication signal. According to the method, an early correlation result between the received communication signal and a first copy of the received communication signal is determined. A prompt correlation result between the received communication signal and a second copy of the received communication signal is determined. The second copy of the received communication signal phase-lags the first copy by a correlator spacing. A late correlation result between the received communication signal and a third copy of the received communication signal is determined. The third copy of the received communication signal phase-lags the second copy by the correlator spacing. A noise-floor independent discriminator generates an auto-correlation function having a peak correlation. The phase error is calculated as a spacing between the prompt correlation and the peak correlation using a function of the prompt, early and late correlations independent of a noise floor estimate.

In another aspect of the invention, a system is provided for code tracking in a CDMA system. The system includes a receiver front-end for receiving a CDMA-based communication system and generating a digital IF signal. A carrier removal function down-converts the digital IF signal to a received C/A code signal having an in-phase signal, I, and a quadrature signal, Q. A code replica generator generates three replicas of the received C/A code signal. The three copies of the received C/A code signal are a early code, a prompt code and a late code. Six code wipeoff correlators determine a correlation between the in-phase signal, I, and each of the early code, the prompt code and the late code, and between the quadrature signal, Q, and each of the early code, the prompt code and the late code. A noise-floor independent delay-lock loop discriminator calculates a prompt correlation result, an early correlation result and a late correlation result using the six correlations calculated by the six code wipeoff correlators. The discriminator generates an auto-correlation function having a peak correlation and calculates a phase error as a spacing between the prompt correlation result and the peak correlation using a function of the prompt, early and late correlations independent of a noise floor estimate.

Various advantages, aspects and novel features of the present invention, as well as details of an illustrated embodiment thereof, will be more fully understood from the following description and drawings.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of preferred embodiments, reference is made to the accompanying drawings that form a part hereof, and which show, by way of illustration, specific embodiments in which the invention may be practiced. Other embodiments may be utilized and structural changes may be made without departing from the scope of the present invention.

1. Delay-Locked Loop in a GPS Receiver

Figure 1:
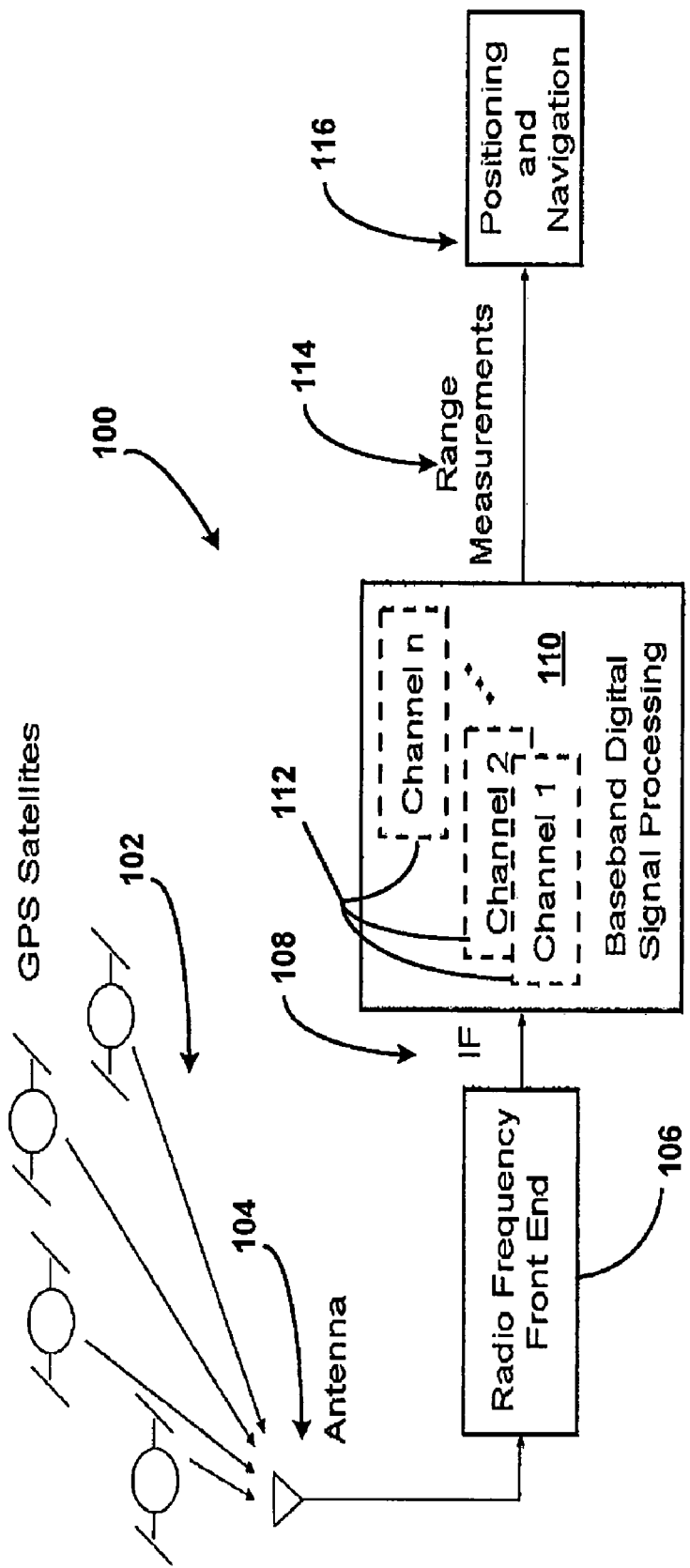
FIG. 1 is a block diagram of a GPS receiver of the type in which examples consistent with the invention may be implemented.

FIG. 1 is a block diagram of a GPS receiver 100 of the type in which examples consistent with the invention may be implemented. A GPS antenna 104 receives signals from all visible GPS satellites 102. The signals are filtered, amplified, down-converted, and digitized by the receiver's radio frequency (RF) front end 106. The RF front end 106 outputs digital immediate frequency (IF) signals 108 to a baseband digital signal processing (DSP) unit 110 in the GPS receiver 102. The baseband DSP unit 110 processes each individual satellite's signals in corresponding channels 112. Each channel 112 may include hardware and software components configured to acquire and track the corresponding satellite 102, demodulate navigation data, and deliver GPS measurements. All channels 112 deliver measurements of all visible satellites to a positioning and navigation unit 118, which computes the time and the receiver position.

Each receiver channel 112 includes tracking loops to track received satellite signals. The receiver tracking loops include a carrier tracking loop to track a received carrier and a code tracking loop to track a received C/A code. A code tracking loop is usually implemented using a delay lock loop (DLL). In examples consistent with the present invention, the DLL includes a discriminator that calculates code phase errors independent of the noise floor.

Figure 2:
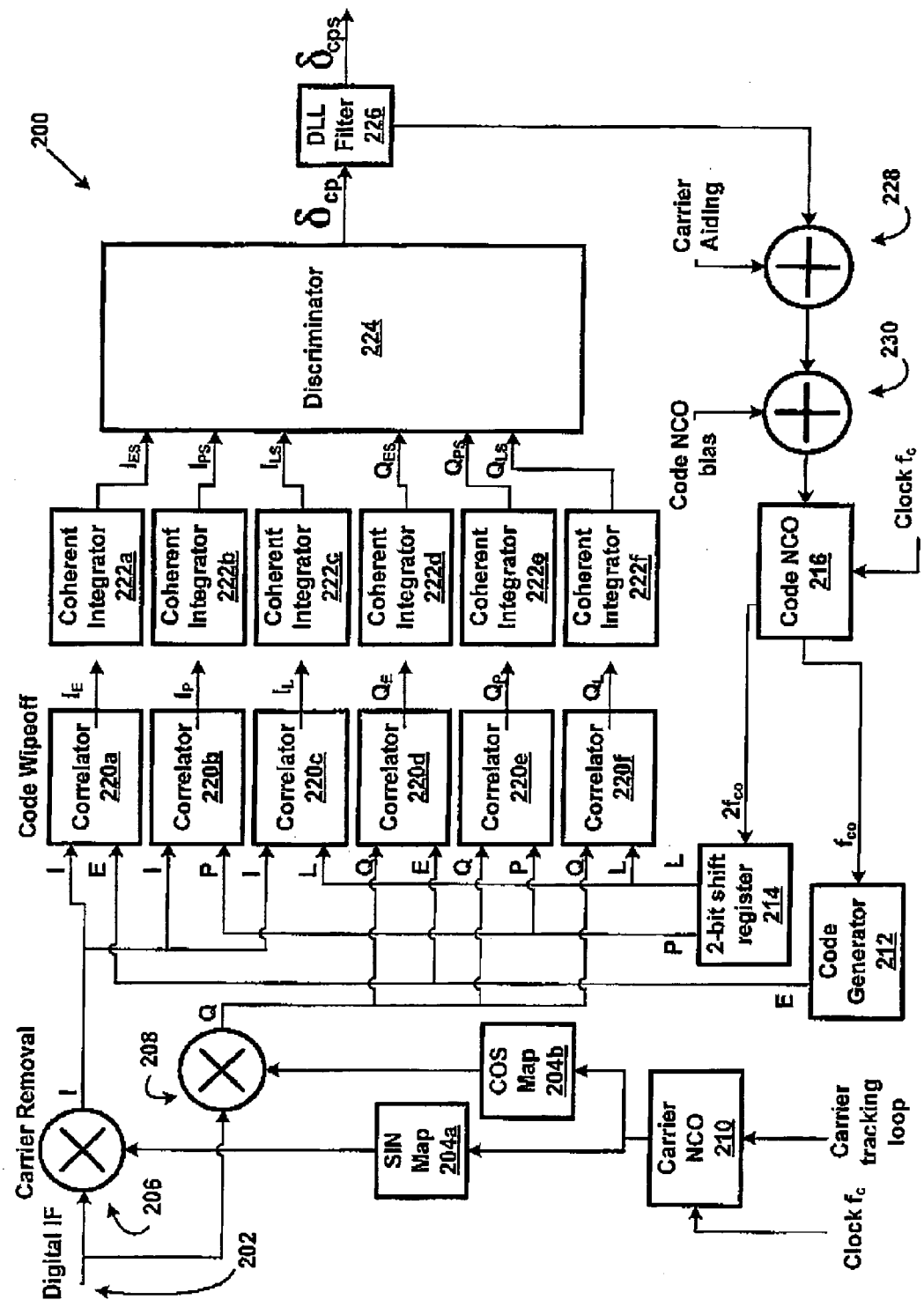
FIG. 2 is a block diagram of a delay lock loop (DLL) function of the type that may be implemented in the GPS receiver in FIG. 1.

FIG. 2 is a block diagram of a code tracking loop implemented using a DLL function 200 of the type that may be implemented in the GPS receiver in FIG. 1. A digital IF signal 202 is input to the DLL function 200 from the RF front end 106 (in FIG. 1). The digital IF signal 202 is fed to two carrier removal mixers, an in-phase carrier removal mixer 206 and a quadrature carrier removal mixer 208. The digital IF signal 202 is mixed at the in-phase and quadrature carrier removal mixers 206, 208 with digital sine carrier signal in an in-phase branch and a digital cosine carrier signal in a quadrature branch, respectively. The sine and cosine carrier signals are typically generated by feeding a periodic stair signal generated by a carrier numerical controlled oscillator (NCO) 210 to a sine map 204a and a cosine map 204b, respectively. After the mixers 206 and 208, the digital IF signal is down-converted to a baseband in-phase (I) signal I and a quadrature (Q) signal Q. The carrier tracking loop (not shown) synchronizes the frequency or phase of the duplicated carrier signals with that of the received carrier. The carrier is removed from the digital IF signal 202 at the outputs of the mixers 206, 208 in the I and Q branches, respectively, leaving both the C/A code and navigation data.

The I and Q signals generated by the carrier removal mixers 206, 208 are then correlated with three copies of the C/A code. The three copies of the C/A code include an early code E, a prompt code P, and a late code L. The first copy, the early code E, is a copy of the C/A code generated by a code generator 212, which uses the code phase offset calculated by the DLL to control the phase of this duplicated C/A code.

The second copy of the C/A code is the prompt code P, which may be generated by delaying the early code E using a 2-bit shift register 214 by the correlator spacing d. In other words, the phase of the early code E is advanced by d chips ahead of the prompt code P. In a standard implementation in a GPS receiver, the correlator spacing d is 0.5 chips. A reduced correlator spacing d, for example 0.1 chips, is often used in order to mitigate multipath and to decrease code phase measurement noise. The prompt code tends to align the received C/A code; however, due to user dynamics, receiver clock instability and noise, there exists a code phase offset, which is also called code tracking error, between the phases of the prompt code P and the received C/A code.

The third copy of the C/A code is the late code L, which is generated by further delaying the prompt code P using 2-bit shift register 214. Typically, the early, prompt and later codes are equally spaced between each other by a correlator spacing d. Thus, the late code L lags the early code E by (2d), which is called early-late correlator spacing.

The three duplicated C/A codes, E, P, and L, are correlated with each of the I and Q baseband signals using six code wipe-off correlators $220a\text{-}f$ to yield three correlation results for each of the I and Q baseband signals. Six correlation results are output from the code wipe-off correlators $220a\text{-}f$: $I_E$, $I_P$, $I_L$, $Q_E$, $Q_P$, and $Q_L$, as shown in FIG. 2.

In the digital correlators $220a\text{-}f$ in FIG. 2, the correlation results, $I_E$, $I_P$, $I_L$, $Q_E$, $Q_P$, and $Q_L$, are output to corresponding coherent integrators $222a\text{-}f$ to be integrated for a predetermined time interval. The selected predetermined interval in GPS receivers is typically specified as the pre-detection integration (PDI) time. At each PDI interval, the integrate and dump circuits $222a\text{-}f$ output their integration results $I_{ES}$, $I_{PS}$, $I_{LS}$, $Q_{ES}$, $Q_{PS}$, and $Q_{LS}$ to a DLL discriminator 224.

The discriminator 224 uses the filtered correlation results $I_{ES}$, $I_{PS}$, $I_{LS}$, $Q_{ES}$, $Q_{PS}$, and $Q_{LS}$ to calculate the phase difference between the received C/A code and the receiver's duplicated prompt C/A code. The discriminator 224 generates the phase difference, which is a calculated C/A code phase tracking error (or bias). The code phase tracking error may be filtered by a DLL filter 226 to smooth out the code phase tracking error results.

The DLL filter 226 is typically a low-pass filter which is used to reduce noise in the discriminator outputs. It may store the code phase errors as they are generated by the DLL discriminator 224. The DLL filter 226 may compare each new code phase error to the previously generated code phase errors and either eliminate or change any values that are too high or too low. The DLL filter 226 ensures that it does not overactively adjust the output frequency of code CN0 216.

The DLL is often implemented as a carrier-aiding style. Since carrier tracking loop can track signals more closely, it can detect user dynamics more precisely than the DLL. Thus, the velocity aiding information, after being properly scaled, from carrier tracking loop can be used to assist the DLL. Adder 228 is the place where the carrier adding information is combined with the filtered code tracking error. Their summation is the input to the code NCO 216. Meanwhile, an intentional code NCO bias may also be added at adder 230, making the output frequency of the code NCO 216 centered at the nominal C/A code rate which is equal to 1023 chips per ms.

Controlled by its input signal, the code NCO 216 accordingly adjusts its output code rate, $f_{co}$, to synchronize the phase of the duplicated prompt code with that of the received code.

Those of ordinary skill in the art will appreciate that the components shown in FIG. 2 may be implemented using any suitable hardware and/or software configuration in a DSP-based environment, in a general-purpose processor environment, or in an environment using both a DSP and a general-purpose processor. In addition, mathematical equations described herein may be performed using suitable software programming techniques. All references to "calculating" and use of any mathematical equations are understood to include implementation by suitable software programming techniques.

The DLL discriminator 224 in FIG. 2 uses a non-coherent early minus late (EML) envelope method. The non-coherent EML discriminator method operates by computing early, prompt and late envelopes; plotting them as a function of their code phase delays and then analyzing the relationship between the E, P, and L envelopes. The E, P, and L envelopes may be computed as follows $$E = \sqrt{I_{ES}^2 + Q_{ES}^2} \quad \text{(Equation 1)}$$

$$P = \sqrt{I_{PS}^2 + Q_{PS}^2} \quad \text{(Equation 2)}$$

$$L = \sqrt{I_{LS}^2 + Q_{LS}^2} \quad \text{(Equation 3)}$$

To increase the receiver code tracking sensitivity, the DLL discriminator typically performs a non-coherent integration as follows:

$$E = \sum_{n=1}^{N_{nc}} \sqrt{I_{ES}^2(n) + Q_{ES}^2(n)} \quad \text{(Equation 4)}$$

$$P = \sum_{n=1}^{N_{nc}} \sqrt{I_{PS}^2(n) + Q_{PS}^2(n)} \quad \text{(Equation 5)}$$

$$L = \sum_{n=1}^{N_{nc}} \sqrt{I_{LS}^2(n) + Q_{LS}^2(n)} \quad \text{(Equation 6)}$$

Figure 3:
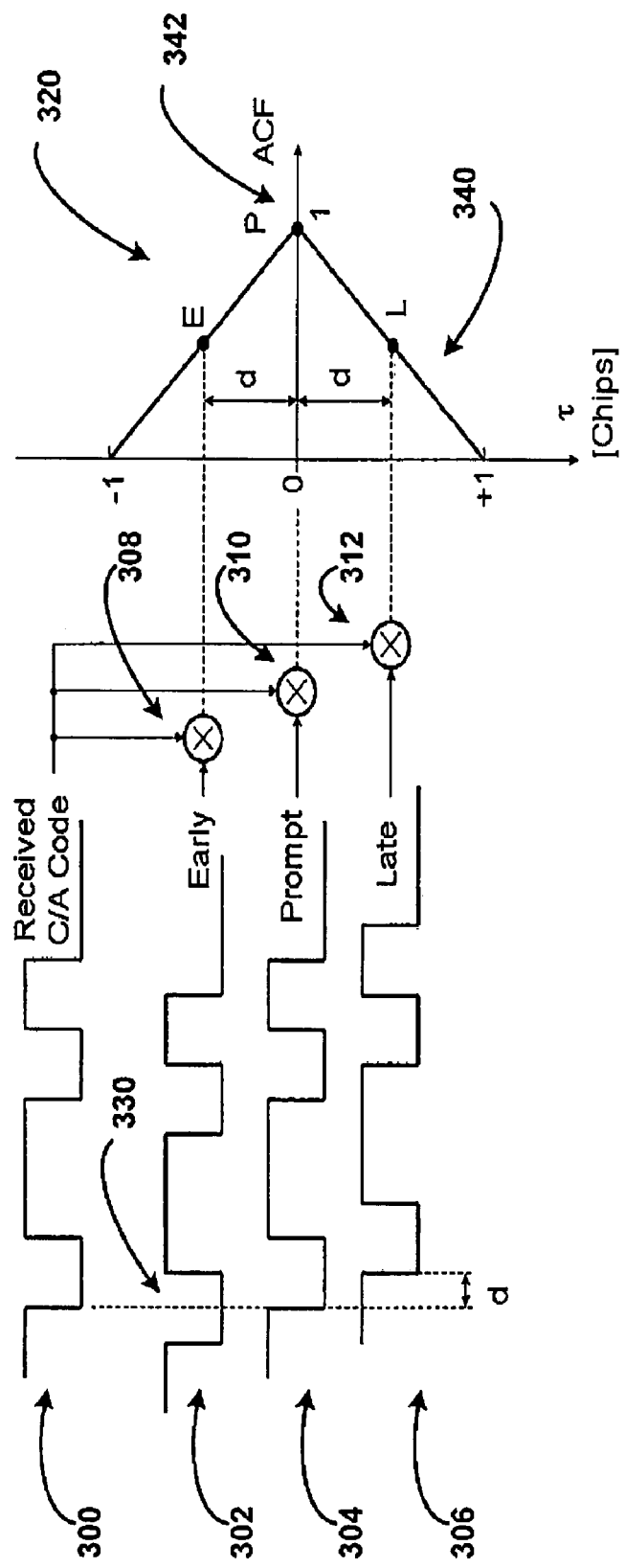
FIG. 3 is a schematic diagram and graph depicting operation of a DLL discriminator in FIG. 2.

FIG. 3 is a schematic diagram and graph depicting operation of an EML DLL discriminator that may be used in FIG. 2. FIG. 3 shows a received C/A code 300, an early code 302, a prompt code 304, and a late code 306. The received C/A code 300 is input to three correlators 308, 310, 312, which represent the correlation functions performed on the received C/A code 300 to the left of the discriminator 224 in FIG. 2. For simplicity, coherent and non-coherent integrations are not shown in this figure. The early code 302 and the received C/A code 300 are input to the first correlator 308 and to generate a correlation result E. The prompt code 304 and the received C/A code 300 are input to the second correlator 310 and to generate a correlation result P. The late code 306 and the received C/A code 300 are input to the third correlator 312 and to generate a correlation result L.

Each of the three correlation results, E, P, and L, are a sample of C/A code auto-correlation function (ACF) graph 320 in FIG. 3. As shown in FIG. 2, the prompt code 304 happens to be aligned with the received C/A code 300 as shown at 330; therefore the correlation result P from the correlator 310 is the highest of the three correlation results. The correlation results E and L from the early and late correlators are reduced relative to the correlation P since their phases are not aligned with that of the received code. This phase delay is the correlator spacing, d, which was used to generate the early, prompt and late codes 302, 304, 306 as described above with reference to FIG. 2. Because the prompt code 304 is aligned with the received C/A code 300 in this particular case, the same phase delays are between the early code 302 and the received C/A code 300, and between the received C/A code 300 and late code 306.

The ACF graph 320 in FIG. 3 is assumed to be ideal and therefore graphed as a triangle 340 with an ACF triangle peak 342. When the prompt code 304 is aligned with the received C/A code 300 as shown in FIG. 3, the prompt correlation result P reaches the ACF triangle peak 342. The correlation results E and L on either side of the triangle are reduced in value, but equal to each other. When the prompt code 304 is not aligned with the received C/A code 300, the correlation results E and L will not be equal to each other. The EML envelope discriminator (the discriminator 224 in FIG. 2 for example) may estimate a code phase (CP) offset (or error) between the prompt code 304 and the received code 300 using the difference between correlation values E and L. The EML envelope discriminator (the discriminator 224 in FIG. 2 for example) may determine the code phase offset, $\delta_{cp}$, using Equation 7 as follows:

$$\delta_{cp} = (1-d)\frac{E-L}{E+L} \quad \text{(Equation 7)}$$

The calculated code phase offset, $\delta_{cp}$, is the input to the DLL filter. The filtered code phase offset, $\delta_{cps}$, may be used to generate the code phase and then pseudorange measurements for the corresponding satellite signal. It may also be used by the code NCO 216 to synchronize the prompt code 304 with the received code 300.

The basic operation of typical GPS receivers, tracking loops and DLLs, as illustrated in FIGS. 1, 2 and 3 are known in the art. For example, example receivers, tracking loops and DLLs are described in E. Kaplan, Understanding GPS: Principles and Applications, 2nd Edition, Artech House, Inc., 2006, which is incorporated herein by reference. Examples of noise-floor independent discriminators consistent with the present invention may be implemented in, but not limited to, receivers of the type described therein.

The correlation results cannot be exactly zero in real-world operation, even if the received signal does not contain a desired satellite'C/A code, due to received signal noise, receiver thermal noise and other noise related to auto- and cross-correlation interferences. In applying the DLL EML discriminator Equation 7, the noise floor is typically subtracted from correlation results. There are a variety of methods for estimating the noise floor in a GPS receiver that are well known in the art. However, ensuring that noise floor estimating methods operate with sufficient accuracy is difficult, especially for weak signals. Any inaccuracies in estimating the noise floor results in inaccuracies in the calculated code phase error given by Equation 7.

In example implementations of systems and methods consistent with the invention, a discriminator employs a method that is based on the above EML envelope method but does not require any receiver noise floor estimation and results in improved accuracy of the DLL EML discriminator. An improved EML envelope method may be implemented and perform a noise-floor independent method for determining the code phase error, $\delta_{cp}$.

Figure 4:
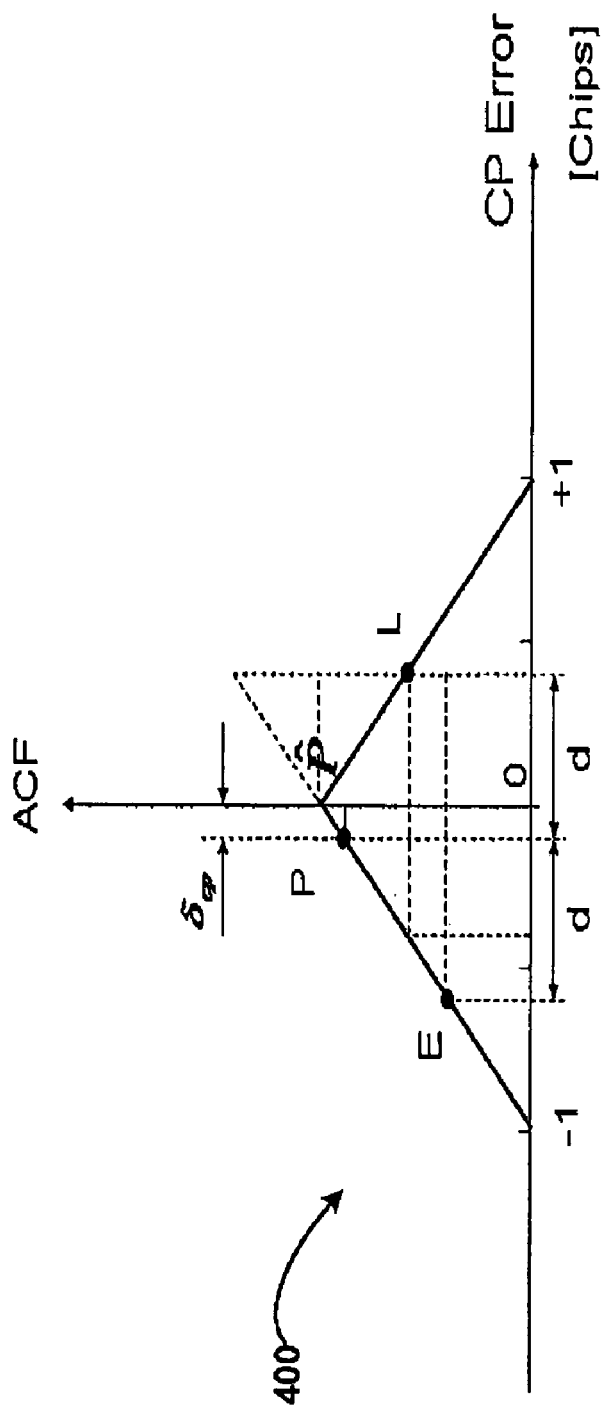
FIG. 4 is a graph depicting operation of the DLL discriminator in FIG. 2 using noise floor independent carrier phase offset detection.

FIG. 4 is a graph 400 depicting operation of the DLL discriminator in FIG. 2 using noise floor independent carrier phase offset detection. The DLL discriminator is assumed to use an ideal ACF as shown by the triangle shaped graph 400. The graph 400 shows a prompt correlation result P off the peak of the graph 400 at a CP offset of $\delta_{cp}$. The CP offset $\delta_{cp}$ is the same offset between the prompt code and the received C/A code. The prompt code 304 and received C/A code 300 in FIG. 3 are exactly aligned, which is actually a rare case. If they are not aligned, they are separated by the CP offset, and the prompt correlation result P is not located at the ACF triangle peak. In addition, the correlation results E and L are not equal to one another. In FIG. 4, the receiver correlators output E, P and L, but the actual peak of the triangle graph 400 is $\hat{P}$ whose value is not directly reported; however, the unknown value of $\hat{P}$ can be related to the correlator outputs E, P and L by the following two equations:

$$\hat{P} = P + \frac{1}{2}|E - L| \quad \text{(Equation 8)}$$

$$E + L = \frac{(\hat{P} - E) + (\hat{P} - L)}{2d}(2 - 2d) \quad \text{(Equation 9)}$$

The above two equations can be easily derived based on some geometric relationship for an ideal triangle, and they are valid for any value of CP offset $\delta_{cp}$. The peak parameter $\hat{P}$ is substituted by Equation (8) in Equation (9), then Equation (9) becomes $$E+L=(1-d)(2P+|E-L|-(E+L)) \quad (10)$$

Substituting the denominator in Equation (7) by the above equation yields:

$$\delta_{cp} = d\frac{E - L}{2P + |E - L| - (E + L)} \quad (11)$$

Equation (11) determines the CP offset and is noise-floor independent. Receiver channel correlator outputs E, P and L all contain a noise floor. As such, the correlation results may be restated as: E−n, P−n and L−n, where n is an estimated noise floor by the receiver. If these restated correlation outputs are used in Equation (7), then the calculated CP offset becomes:

$$\delta_{cp} = (1 - d)\frac{(E - n) - (L - n)}{(E - n) + (L - n)} \quad (12)$$

$$= (1 - d)\frac{E - L}{E + L - 2n}$$

The above equation shows that the original EML discriminator depends on the noise floor estimate. If the estimation of noise floor n is not accurate, then the calculated CP error will not be accurate, either. If the restated correlation outputs (E−n, P−n and L−n) are used in Equation (11), then the calculated CP error becomes:

$$\delta_{cp} = d\frac{(E - n) - (L - n)}{2(P - n) + |(E - n) - (L - n)| - ((E - n) + (L - n))} \quad (13)$$

$$= d\frac{E - L}{2P + |E - L| - (E + L)}$$

The original discriminator Equation (7) and the newly derived discriminator Equation (13) seem to be different only in their denominator, the later actually implements a NFI EML discriminator that is noise floor independent since the noise floor term n is cancelled out in the equation. Therefore, the CP offset $\delta_{cp}$ may be determined without having to estimate the receiver noise floor. The correlator outputs E, P and L may be used directly in Equation (11) to calculate the CP offset $\delta_{cp}$ without being subtracted by the noise floor. On the other hands, if the noise floor is estimated inaccurately, Equation 7 will deliver an inaccurate code phase error, while the accuracy of Equation 11 is unaffected.

Figure 5:
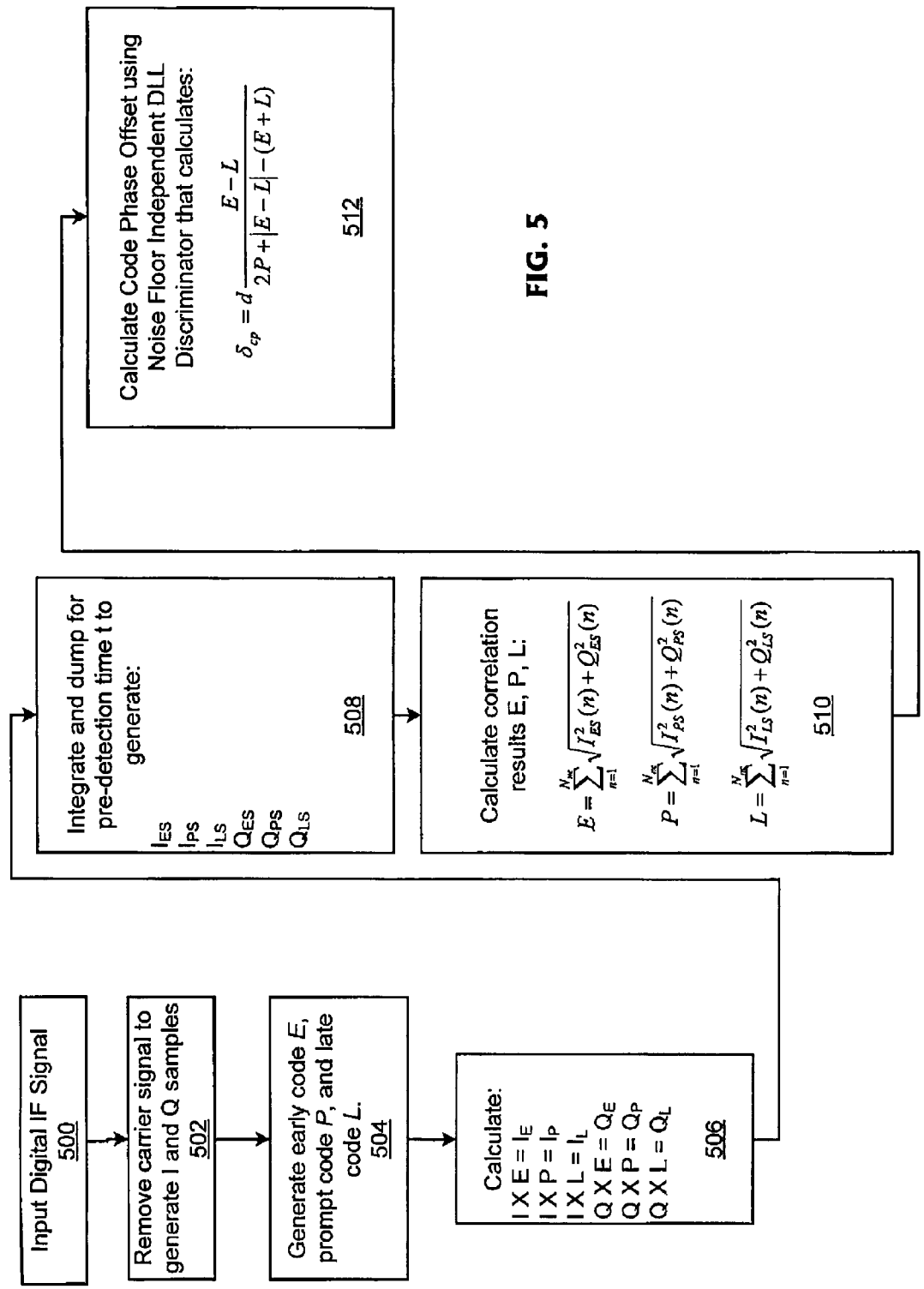
FIG. 5 is a flowchart depicting operation of an example implementation of a method for determining a code phase offset using the noise floor independent EML discriminator.

FIG. 5 is a flowchart depicting operation of an example implementation of a method for determining a code phase offset using the noise floor independent EML discriminator 224 (FIG. 2) described above with reference to FIG. 3. In an example GPS receiver, the method in FIG. 5 may be implemented using a DSP-based baseband processing system implementing functions such as the functions described above with reference to FIG. 2. In some example implementations, the method illustrated in FIG. 5 may be performed in the context of a receiver channel for processing satellite signals from one of the satellites being tracked.

At step 500, the digital IF signal may be received from a RF receiver front end, such as the RF receiver front end 106 (in FIG. 1). At step 502, the carrier signal may be removed leaving the baseband I and Q signals. Step 502 may be performed by mixing the digital IF signal with both an in-phase replicated carrier frequency and a quadrature-phase replicated carrier frequency as described above with reference to FIG. 2. At step 504, the early E code, prompt P code and late L code are generated. A code generator generates an early E code from a replicated code based on the code phase offset calculated by the NFI EML discriminator 224 (in FIG. 2). A 2-bit delay may be used to generate the prompt P code and the late L code.

At step 506, the E, P, and L codes are used to generate six correlation results, $I_E$, $I_P$, $I_L$, $Q_E$, $Q_P$, and $Q_L$. The six correlation results are integrated at step 508 for a pre-detection time, t, to generate $I_{ES}$, $I_{PS}$, $I_{LS}$, $Q_{ES}$, $Q_{PS}$, and $Q_{LS}$. These six signals are coupled to the NFI EMI discriminator 224. The NFI EMI discriminator 224 uses the six signals at step 510 to generate correlation results E, P and L. In one example, the correlation results E, P and L may be calculated using Equations 4, 5 and 6 above. The correlation results E, P and L are used in Equation 11 above to generate the CP offset as shown in step 512.

(In Box 506 in FIG. 5, it is Better to Use "$\otimes$" instead of "X" signs)

Because the NFI EML discriminator does not depend on the accuracy of any noise floor estimates, the receiver implementing the NFI EML discriminator may provide more accurate code range measurements. Accordingly, based on these code range measurements, receiver position fixes will be more accurate. In addition, a more accurate CP offset $\delta_{cp}$ may permit the DLL to adjust the code NCO output frequency more properly, resulting in better code tracking performance and a higher GPS code phase measurement availability and position fix availability. In addition, because the magnitude of the noise floor may be closer to that of correlation results derived from weak signals, the accuracy of noise floor estimation typically becomes more critical. Thus, the receiver performance, in terms of measurement and position fix availability and accuracy, may be improved in weak signal environments by replacing the original EML discriminator with the NFI EML discriminator described with reference to FIG. 4.

The NFI EML discriminator assumes a perfect triangle-shaped ACF curve even though limited receiver front end bandwidth may deform an actual ACF curve. For example, the triangle peak becomes flat and the two sides of the triangle are no longer lines. Such a deformed ACF curve renders Equation (11) somewhat inaccurate. The deformity in the ACF curve may be compensated to some extent. For example, the prompt correlator output value P may be artificially inflated by a factor and the value of the factor may be optimized by evaluating the accuracy of the performance improvement of the NFI EML discriminator under different $C/N_0$ environments. As described here, however, the NFI EML discriminator may still provide substantially improved accuracy over the traditional EML discriminator, which also assumed a perfect ACF curve.

FIGS. 6-11 illustrate improvements offered by the use of a NFI EML discriminator over that of a traditional EML discriminator from tests performed using simulation as well as actual bench tests. In simulation tests, a simulation software program that generates I and Q signal data points and performs tracking loops is used to compare the original and the NFI EML discriminators. In an example simulation, the loop filters (for example, the DLL filter 226) in the program were left open, and the outputs of the DLL discriminator-under-test were examined by injecting an initial known code bias. In an ideal case, the output of the DLL discriminator-under-test should be equal to the initial code bias input. In reality, the output and bias input are usually not equal due to noise and the inaccuracy of the discriminator method. The difference between the DLL discriminator output and the bias input is regarded as the CP measurement error of the discriminator output.

Figure 6:
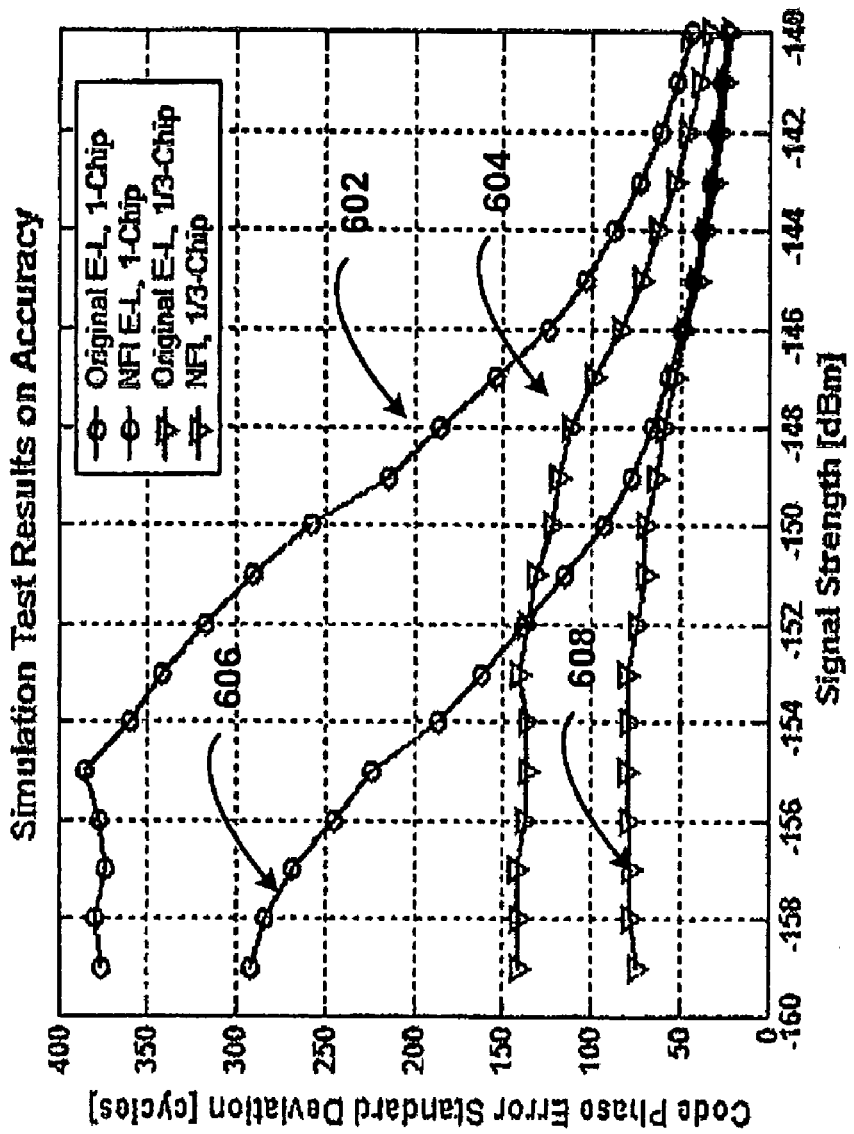
FIG. 6 is a graph illustrating simulation test results comparing code phase measurement accuracy of a NFI DLL discriminator with a traditional DLL discriminator.

FIG. 6 shows the CP measurement error standard deviations measured for outputs of both the traditional EML discriminator and the NFI EML discriminator in the unit of cycles (1 C/A chip is equal to 154 L1 cycles). The data generated for the original EML discriminator is plotted as curves 602 and 604. The data generated for the NFI EML discriminator is curves 606 and 608. Curves 604 and 608, which have triangular points, are for the test case in which 2d is equal to 1 chip. Curves 602 and 606 having dotted points are for the case where 2d is equal to ⅓ chip. For the same value of 2d under the same signal strength, the NFI EML discriminator has a smaller CP measurement error standard deviation than the original EML discriminator. In addition, the accuracy improvement is more significant for weaker signals as expected. In this simulation, the RF front end loss is assumed to be 4 dB.

Figure 7:
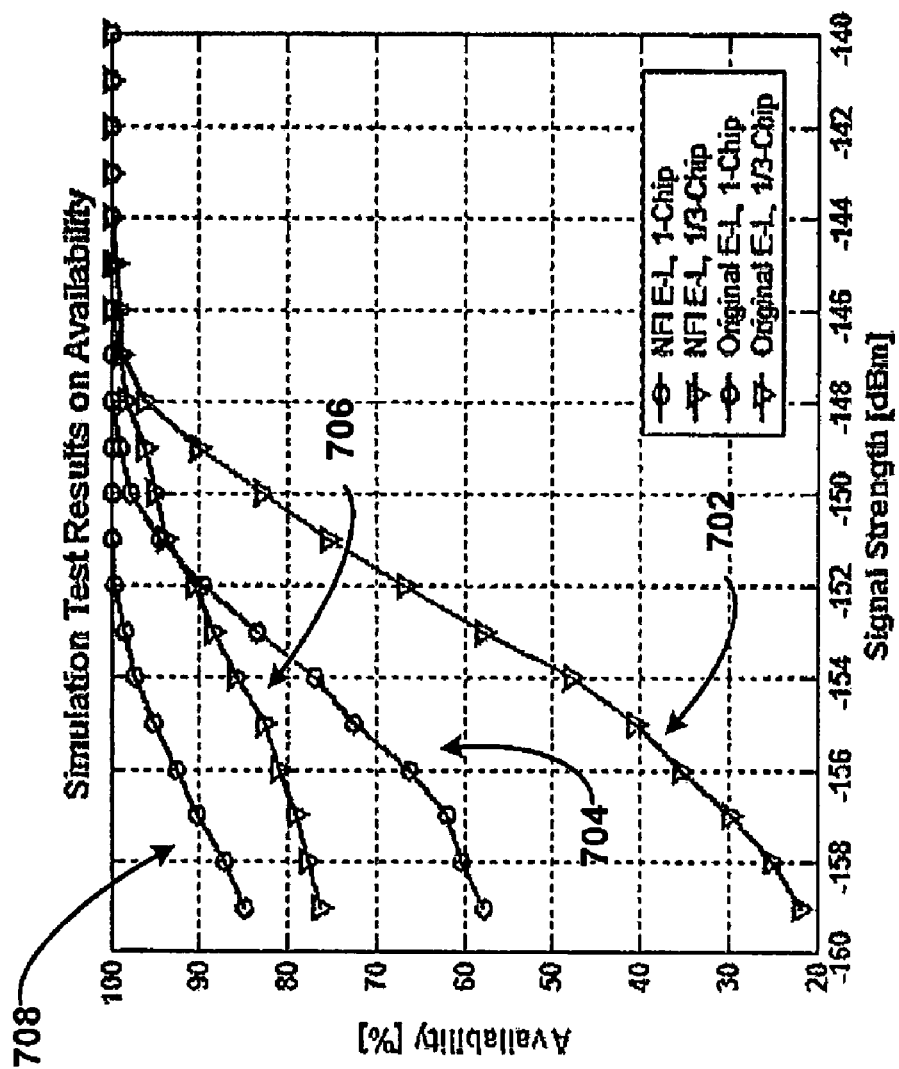
FIG. 7 is a graph illustrating simulation test results comparing code phase measurement availability of a NFI DLL discriminator with a traditional DLL discriminator.

FIG. 7 compares the CP measurement availability for the EML discriminator and the NFI EML discrminator using the same simulation program as for FIG. 6. A code phase error output from a discriminator, either the EML or the NFI EML, and the corresponding code phase measurement are regarded as valid if the magnitude of the code phase error is less than d, which indicates that the discriminator is operating in its linear operation range. Thus, availability here is defined as the percentage of valid code phase measurements among the total number of testing point. The data generated for the original EML discriminator is plotted as curves 702 and 704. The data generated for the NFI EML discriminator is curves 706 and 708. Curves 702 and 706, which have triangular points, are for the test case in which 2d is equal to ⅓ chip. Curves 704 and 708 having dotted points are for the case where 2d is equal to 1 chip. FIG. 7 shows that the NFI EML discriminator has a higher measurement availability than the original EML discriminator at various signal strength levels for both narrow and wide correlator spacings.

The simulation program used in the test results in FIGS. 6 and 7 has several limitations. For example, the ACF of the C/A code based on which I and Q data are generated is assumed ideal and has a perfect triangle shape. FIGS. 8-11 illustrate test results based on an actual GPS hardware receiver that implements a NFI EML discriminator of the type described above with reference to FIGS. 4-5.

Figure 8:
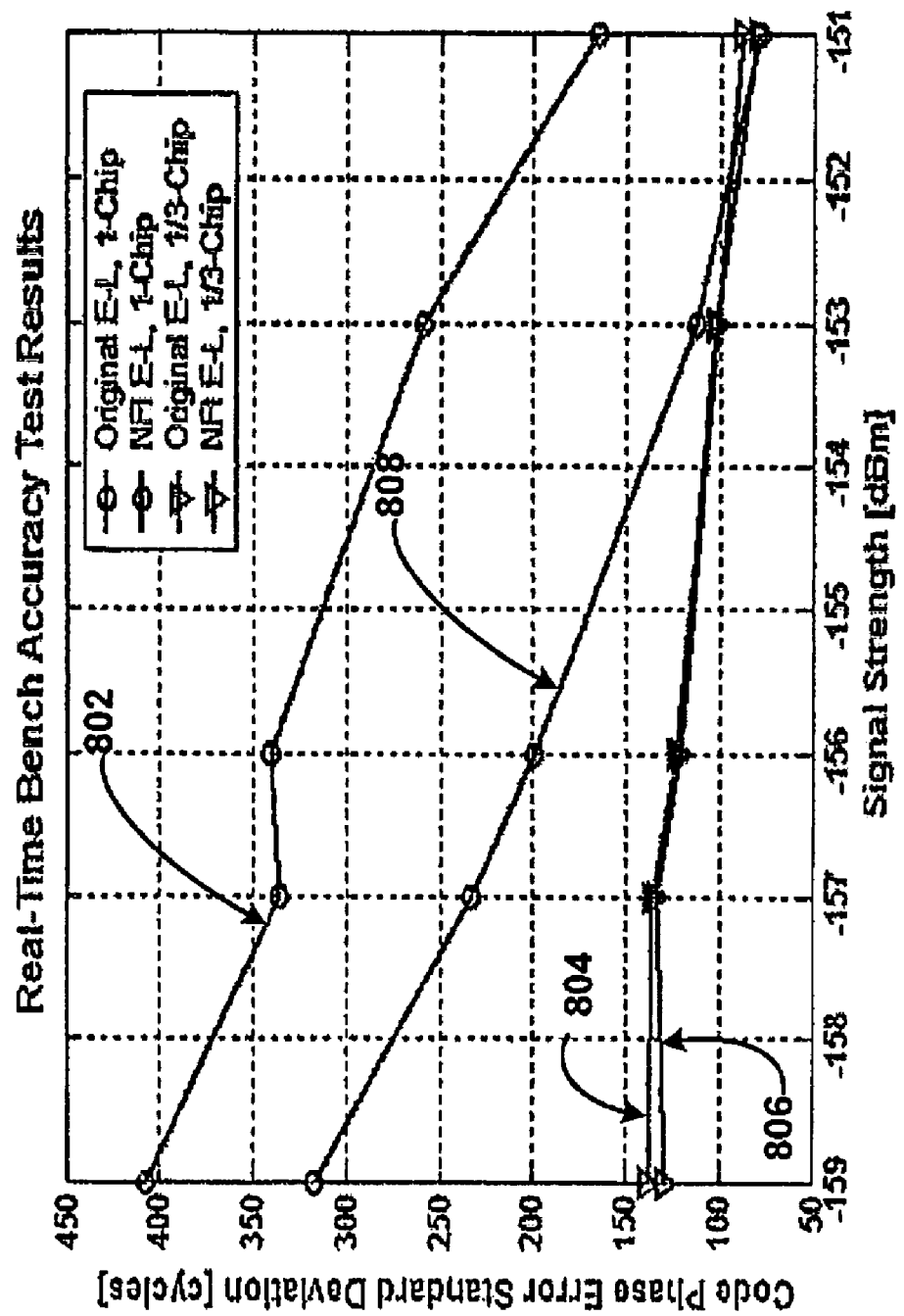
FIG. 8 is a graph illustrating bench test results comparing code phase measurement accuracy of a NFI DLL discriminator with a traditional DLL discriminator.
Figure 9:
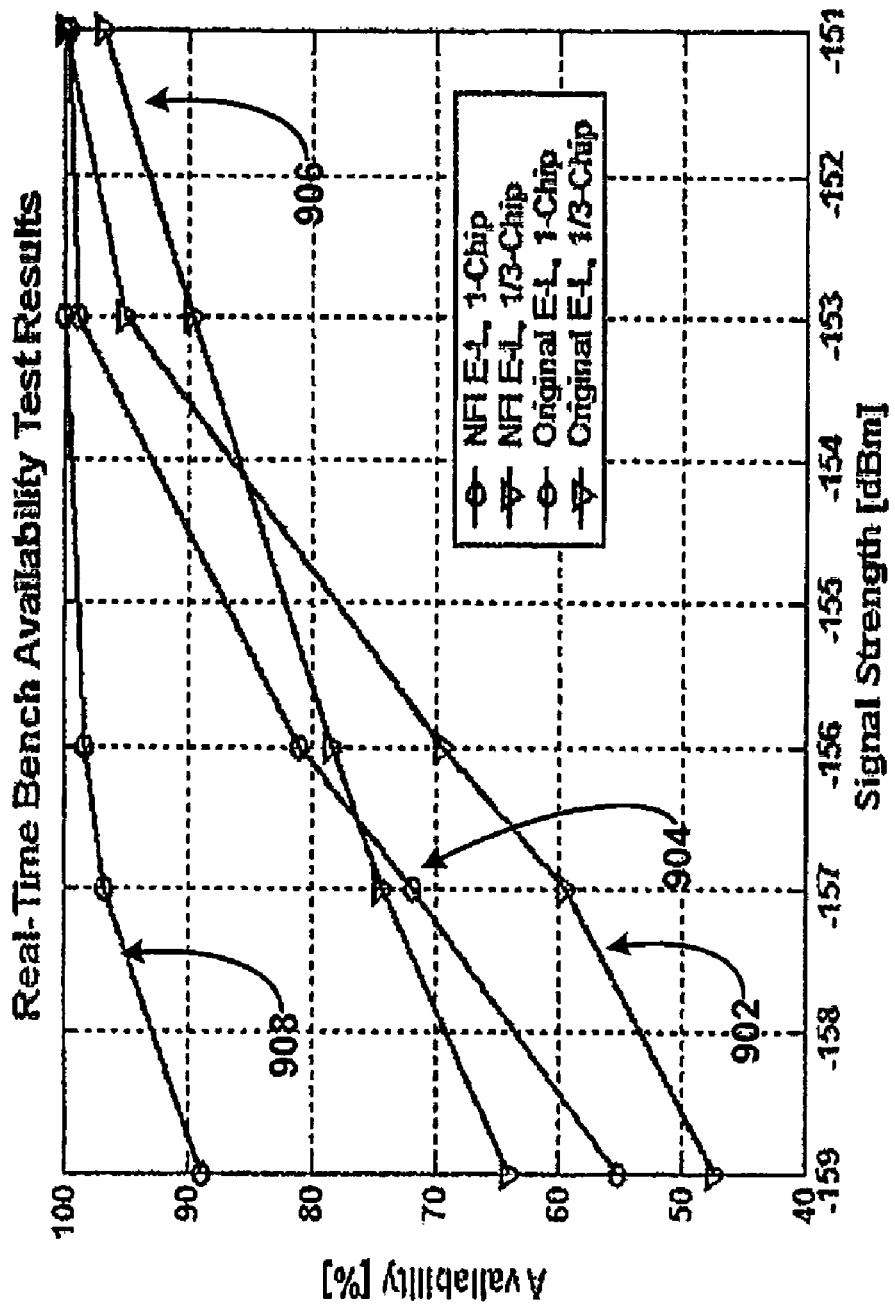
FIG. 9 is a graph illustrating bench test results comparing code phase measurement availability of a NFI DLL discriminator with a traditional DLL discriminator.

FIG. 8 compares the traditional EML discriminator with the NFI EML discriminator in terms of accuracy. The data generated for the original EML discriminator is plotted as curves 802 and 804. The data generated for the NFI EML discriminator is curves 806 and 808. In the test, a GPS hardware receiver was uploaded with the same GPS firmware except for different DLL discriminator functions, and the GPS signals used were from a GPS signal generator. Other test settings were similar to those used in the test that generated the data shown in FIG. 6. FIG. 8 shows a significant accuracy improvement using the NFI EML discriminator for the wide correlator spacing (2d=1 chip) case, though the narrow correlator spacing case does not show much difference in this particular test. FIG. 9 shows the improvement in measurement availability performance using the same devices as in the tests run for FIG. 8. In FIG. 9, the data generated for the original EML discriminator is plotted as curves 902 and 904. The data generated for the NFI EML discriminator is curves 906 and 908.

Figure 10:
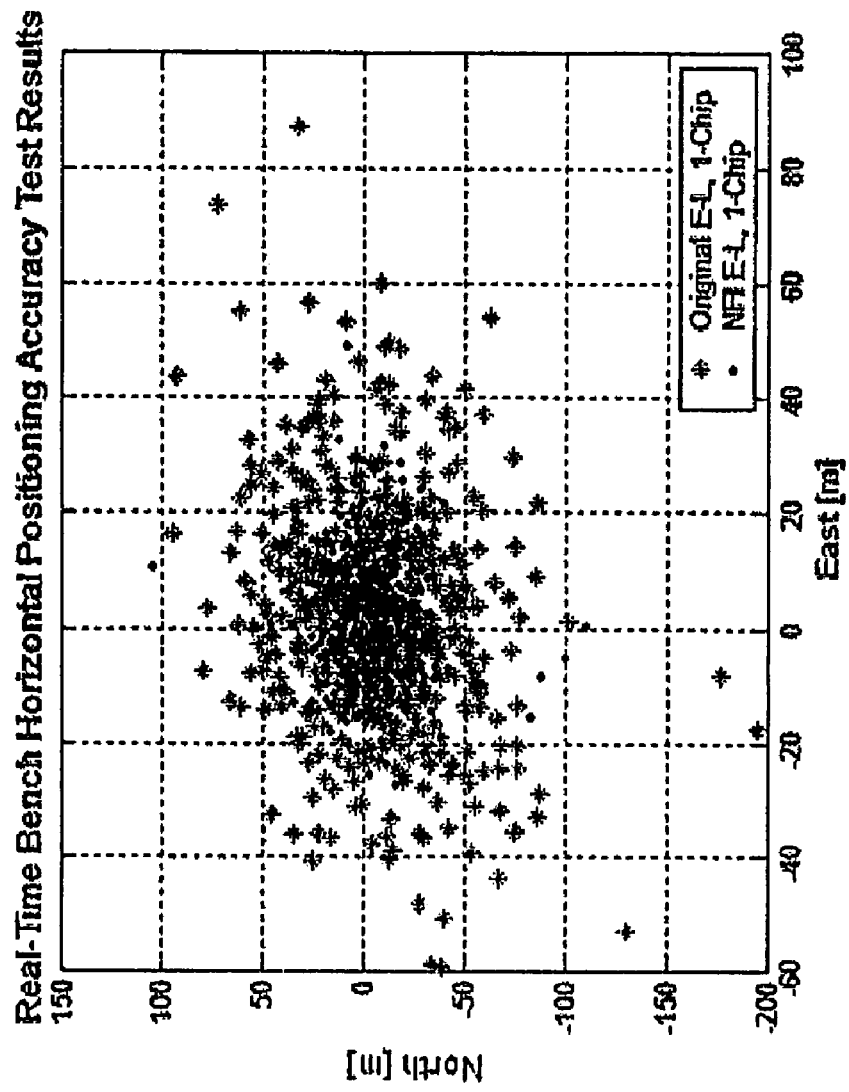
FIG. 10 is a graph illustrating horizontal position fix errors from bench test results comparing accuracy of a NFI DLL discriminator with a traditional DLL discriminator in the position domain.

In the simulation and bench tests illustrated in FIGS. 6-9, accuracy performance was compared in the range domain. In FIG. 10, the accuracy of two same GPS receivers, except for one using the original EML discriminator and the other using the NFI EML discriminator, was compared in the position domain. With their tracking loops closed and their DLL filtering disabled, the two GPS receivers both calculated position fixes using a weighted least squares (WLS) navigation algorithm without any filtering. For the similar reason that DLL filter is disabled, the navigation filtering, such as Kalman filtering, is disabled so that any unexpected filtering effect on position fix accuracy can be avoided in the comparison. FIG. 10 shows their horizontal position fix errors. The darker smaller points in FIG. 10 are test points for GPS receivers using the NFI EML discriminator. The larger lighter points in FIG. 10 are test points for GPS receivers using the traditional EML discriminator. In the test, live GPS signals were fed to the two receivers simultaneously from a signal splitter after most of the signals were attenuated roughly down to −151 dBm level. The receiver using the traditional EML discriminator, has a horizontal position error standard deviation of 22.0 meters, while the other, using the new discriminator, has an error standard deviation only of 12.2 meters. So the position errors were reduced by almost a half.

Figure 11:
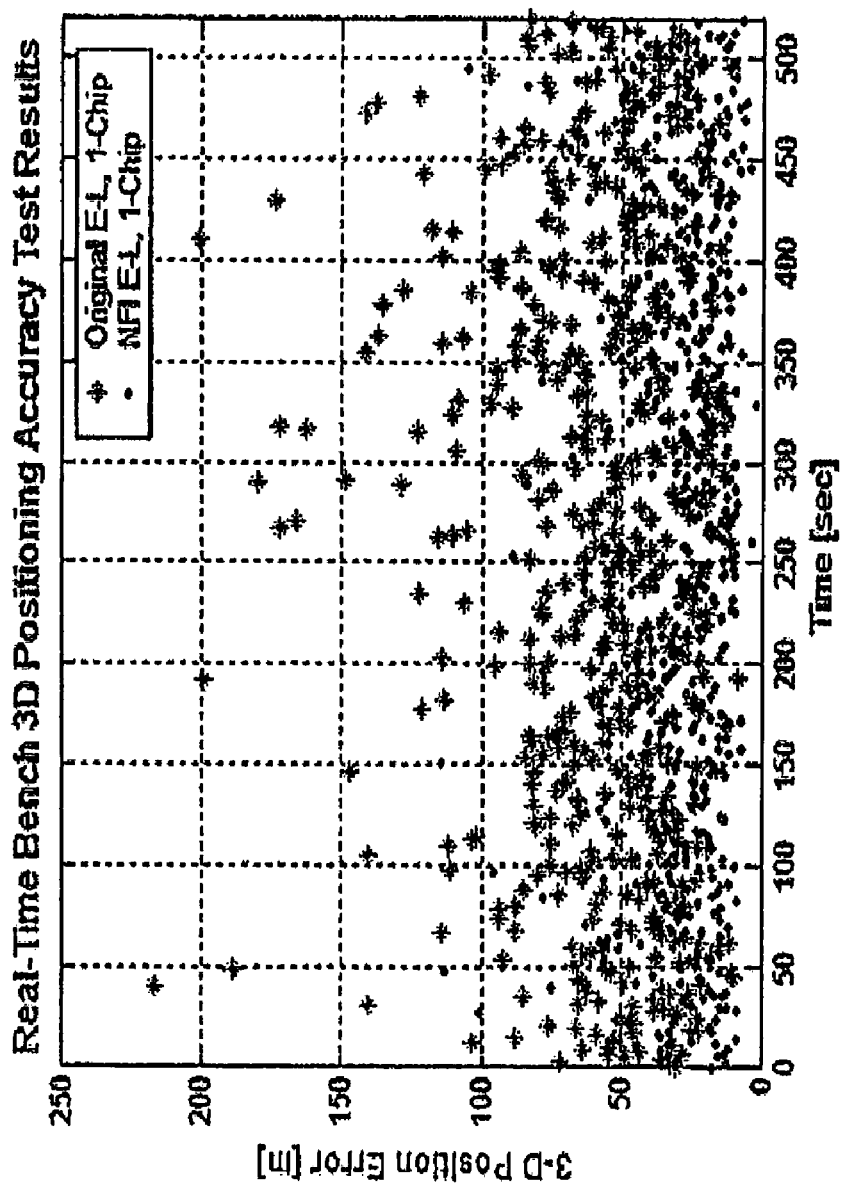
FIG. 11 is a graph illustrating 3D position errors from bench test results comparing accuracy of a NFI DLL discriminator with a traditional DLL discriminator in the position domain.

FIG. 11 shows 3D position errors in the same test as in FIG. 10. The darker smaller points in FIG. 11 are test points for GPS receivers using the NFI EML discriminator. The larger lighter points in FIG. 11 are test points for GPS receivers using the traditional EML discriminator. The receiver using the original EML discriminator has a 3D position error standard deviation of 32.4 meters, while the other, using the NFI EML discriminator, has an error standard deviation only of 16.8 meters. Both FIGS. 10 and 11 demonstrate the position fix accuracy improvement offered by the new NFI EML discriminator.

Those of ordinary skill in the art will appreciate that NFI DLL discriminators have been described herein in the context of GPS receivers. However, NFI DLL discriminators may be implemented in any CDMA system, or in any signal processing environment in which DLL discriminators find advantageous use.

One of ordinary skill in the art will appreciate that the methods and systems described herein may be implemented using one or more processors having memory resources available for storing program code and data. One skilled in the art will also appreciate that all or part of systems and methods consistent with the present invention may be stored on or read from other machine-readable media, for example, secondary storage devices such as hard disks, floppy disks, and CD-ROMs; a signal received from a network; or other forms of ROM or RAM either currently known or later developed.

The foregoing description of implementations has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed:

1. A method for determining a phase error of a received communication signal, the method comprising:
   determining an early correlation result between the received communication signal and a first copy of the received communication signal;
   determining a prompt correlation result between the received communication signal and a second copy of the received communication signal, the second copy of the received communication signal phase-lagging the first copy by correlator spacing;
   determining a late correlation result between the received communication signal and a third copy of the received communication signal, the third copy of the received communication signal phase-lagging the second copy by the correlator spacing;
   determining a peak correlation result based on the early, the prompt and the late correlation results; and
   applying the peak correlation result to a discriminator function to cancel out a noise term in a numerator and a denominator of the discriminator function to generate a noise floor independent discriminator function for calculating the phase error as a spacing between the prompt correlation and the peak correlation using a function of the prompt, early and late correlations independent of a noise floor estimate.

2. The method of claim 1 where the step of using the noise floor independent discriminator comprises:
   calculating the phase error $\delta_{cp}$ using:

$$\delta_{cp} = d \frac{E - L}{2P + |E - L| - (E + L)}, \text{ where:}$$

d=the correlator spacing,
E=the early correlation result,
P=the prompt correlation result, and
L=the late correlation result.

3. The method of claim 1 where:
the received communications signal includes an in-phase signal, I, and a quadrature signal, Q;
the step of determining the early correlation result includes the steps of:
   determining an $I_E$ correlation of the in-phase signal, I, and the first copy of the received signal;
   determining a $Q_E$ correlation of the quadrature signal, Q, and the first copy of the received signal;
   integrating the $I_E$ correlation and the $Q_E$ correlation, each over a predetection integration interval to generate smooth correlations $I_{ES}$, and $Q_{ES}$;
the step of determining the prompt correlation result includes the steps of:
   determining an $I_P$ correlation of the in-phase signal, I, and the second copy of the received signal;
   determining a $Q_P$ correlation of the quadrature signal, Q, and the second copy of the received signal;
   integrating the Ip correlation and the Qp correlation, each over a predetection integration interval to generate smooth correlations $I_{PS}$, and $Q_{PS}$;
the step of determining the late correlation result includes the steps of:
   determining an $I_L$ correlation of the in-phase signal, I, and the third copy of the received signal;
   determining a $Q_L$ correlation of the quadrature signal, Q, and the third copy of the received signal;
   integrating the $I_L$ correlation and the $Q_L$ correlation, each over a predetection integration interval to generate smooth correlations $I_{LS}$, and $Q_{LS}$.

4. The method of claim 3 where:
the step of determining the early correlation result includes the steps of $$E = \sum_{n=1}^{N_{nc}} \sqrt{I_{ES}^2(n) + Q_{ES}^2(n)}, \text{ where:}$$

E=the early correlation result,
$I_{ES}$=the smooth early correlation for the in-phase signal,
$Q_{ES}$=the smooth early correlation for the quadrature signal,
n=integration index;
the step of determining the prompt correlation result includes the steps of:

$$P = \sum_{n=1}^{N_{nc}} \sqrt{I_{PS}^2(n) + Q_{PS}^2(n)}, \text{ where:}$$

P=the prompt correlation result,
$I_{PS}$=the smooth prompt correlation for the in-phase signal,
$Q_{PS}$=the smooth prompt correlation for the quadrature signal,
n=integration index;

the step of determining the late correlation result includes the steps of:

$$L = \sum_{n=1}^{N_{nc}} \sqrt{I_{LS}^2(n) + Q_{LS}^2(n)}, \text{ where:}$$

L=the late correlation result,
$I_{LS}$=the smooth late correlation for the in-phase signal,
$Q_{LS}$=the smooth late correlation for the quadrature signal,
n=integration index.

5. A method for implementing a code tracking loop in a Code Division Multiple Access (CDMA) receiver, the method comprising:
receiving a CDMA-based signal at a receiver front-end;
downconverting the CDMA-based signal to a digital IF signal;
removing a carrier from the digital IF signal to generate a received code signal;
determining an early correlation result between the received code signal and a first copy of the received code signal;
determining a prompt correlation result between the received code signal and a second copy of the received code signal, the second copy of the received code signal phase-lagging the first copy by a correlator spacing;
determining a late correlation result between the received code signal and a third copy of the received code signal, the third copy of the received code signal phase-lagging the second copy by the correlator spacing;
determining a peak correlation result based on the early, the prompt and the late correlation results; and
applying the peak correlation result to a discriminator function to cancel out a noise term in a numerator and a denominator of the discriminator function to generate a noise floor independent discriminator function for calculating the phase error as a spacing between the prompt correlation and the peak correlation using a function of the prompt, early and late correlations independent of a noise floor estimate.

6. The method of claim 5 where the step of using the noise floor independent discriminator comprises:
calculating the phase error $\delta_{cp}$ using:

$$\delta_{cp} = d \frac{E - L}{2P + |E - L| - (E + L)}, \text{ where:}$$

d=the correlator spacing,
E=the early correlation result,
P=the prompt correlation result, and
L=the late correlation result.

7. The method of claim 5 where:
the received code signal includes an in-phase signal, I, and a quadrature signal, Q;
the step of determining the early correlation result includes the steps of:
determining an $I_E$ correlation of the in-phase signal, I, and the first copy of the received code signal;
determining a $Q_E$ correlation of the quadrature signal, Q, and the first copy of the received code signal;
integrating the $I_E$ correlation and the $Q_E$ correlation, each over a predetection integration interval to generate smooth early correlations $I_{ES}$, and $Q_{ES}$;

the step of determining the prompt correlation result includes the steps of:
determining an Ip correlation of the in-phase signal, I, and the second copy of the received code signal;
determining a $Q_P$ correlation of the quadrature signal, Q, and the second copy of the received code signal;
integrating the $I_P$ correlation and the $Q_P$ correlation, each over a predetection integration interval to generate smooth prompt correlations $I_{PS}$, and $Q_{PS}$;
the step of determining the late correlation result includes the steps of:
determining an $I_L$ correlation of the in-phase signal, I, and the third copy of the received code signal;
determining a $Q_L$ correlation of the quadrature signal, Q, and the third copy of the received code signal;
integrating the $I_L$ correlation and the $Q_L$ correlation, each over a predetection integration interval to generate smooth late correlations $I_{LS}$, and $Q_{LS}$.

8. The method of claim 7 where:
the step of determining the early correlation result includes the steps of:

$$E = \sum_{n=1}^{N_{nc}} \sqrt{I_{ES}^2(n) + Q_{ES}^2(n)}, \text{ where:}$$

E=the early correlation result,
$I_{ES}$=the smooth early correlation for the in-phase signal,
$Q_{ES}$=the smooth early correlation for the quadrature signal,
n=integration index;
the step of determining the prompt correlation result includes the steps of:

$$P = \sum_{n=1}^{N_{nc}} \sqrt{I_{PS}^2(n) + Q_{PS}^2(n)}, \text{ where:}$$

P=the prompt correlation result,
$I_{PS}$=the smooth prompt correlation for the in-phase signal,
$Q_{PS}$=the smooth prompt correlation for the quadrature signal,
n=integration index;
the step of determining the late correlation result includes the steps of:

$$L = \sum_{n=1}^{N_{nc}} \sqrt{I_{LS}^2(n) + Q_{LS}^2(n)}, \text{ where:}$$

L=the late correlation result,
$I_{LS}$=the smooth late correlation for the in-phase signal,
$Q_{LS}$=the smooth late correlation for the quadrature signal,
n=integration index.

9. A method for processing a received coarse/acquisition (C/A) code signal in a delay-locked loop, the method comprising:
determining an early correlation result between the received C/A code signal and a first copy of the received C/A code signal;
determining a prompt correlation result between the received C/A code signal and a second copy of the received C/A code signal, the second copy of the received C/A code signal phase-lagging the first copy by a correlator spacing;

determining a late correlation result between the received C/A code signal and a third copy of the received C/A code signal, the third copy of the received C/A code signal phase-lagging the second copy by the correlator spacing;

determining a peak correlation result based on the early, the prompt and the late correlation results; and applying the peak correlation result to a discriminator function to cancel out a noise term in a numerator and a denominator of the discriminator function to generate a noise floor independent discriminator function for calculating the phase error as a spacing between the prompt correlation and the peak correlation using a function of the prompt, early and late correlations independent of a noise floor estimate.

10. The method of claim 9 where the step of using the noise floor independent discriminator comprises:

calculating the phase error $\delta_{cp}$ using:

$$\delta_{cp} = d \frac{E - L}{2P + |E - L| - (E + L)}, \text{ where:}$$

d=the correlator spacing,
E=the early correlation result,
P=the prompt correlation result, and
L=the late correlation result.

11. The method of claim 9 where:

the received C/A code signal includes an in-phase signal, I, and a quadrature signal, Q;

the step of determining the early correlation result includes the steps of:

determining an $I_E$ correlation of the in-phase signal, I, and the first copy of the received C/A code signal;

determining a $Q_E$ correlation of the quadrature signal, Q, and the first copy of the received C/A code signal;

integrating the $I_E$ correlation and the $Q_E$ correlation, each over a predetection integration interval to generate smooth early correlations $I_{ES}$, and $Q_{ES}$;

the step of determining the prompt correlation result includes the steps of:

determining an $I_P$ correlation of the in-phase signal, I, and the second copy of the received code C/A signal;

determining a $Q_P$ correlation of the quadrature signal, Q, and the second copy of the received C/A code signal;

integrating the $I_P$ correlation and the $Q_P$ correlation, each over a predetection integration interval to generate smooth prompt correlations $I_{PS}$, and $Q_{PS}$;

the step of determining the late correlation result includes the steps of:

determining an $I_L$ correlation of the in-phase signal, I, and the third copy of the received C/A code signal;

determining a $Q_L$ correlation of the quadrature signal, Q, and the third copy of the received C/A code signal;

integrating the $I_L$ correlation and the $Q_L$ correlation, each over a predetection integration interval to generate smooth late correlations $I_{LS}$ and $Q_{LS}$.

12. The method of claim 11 where:

the step of determining the early correlation result includes the steps of:

$$E = \sum_{n=1}^{N_{nc}} \sqrt{I_{ES}^2(n) + Q_{ES}^2(n)}, \text{ where:}$$

E=the early correlation result,
$I_{ES}$=the smooth early correlation for the in-phase signal,
$Q_{ES}$=the smooth early correlation for the quadrature signal,
n=integration index;

the step of determining the prompt correlation result includes the steps of:

$$P = \sum_{n=1}^{N_{nc}} \sqrt{I_{PS}^2(n) + Q_{PS}^2(n)}, \text{ where:}$$

P=the prompt correlation result,
$I_{PS}$=the smooth prompt correlation for the in-phase signal,
$Q_{PS}$=the smooth prompt correlation for the quadrature signal,
n=integration index;

the step of determining the late correlation result includes the steps of:

$$L = \sum_{n=1}^{N_{nc}} \sqrt{I_{LS}^2(n) + Q_{LS}^2(n)}, \text{ where:}$$

L=the late correlation result,
$I_{LS}$=the smooth late correlation for the in-phase signal,
$Q_{LS}$=the smooth late correlation for the quadrature signal,
n=integration index.

13. A system for code tracking in a Code Division Multiple Access (CDMA) system comprising:

a receiver front-end for receiving a CDMA-based communication signal and generating a digital IF signal;

a carrier removal function for down-converting the digital IF signal to a received C/A code signal having an in-phase signal, I, and a quadrature signal, Q;

a code replica generator for generating three replicas of the received coarse/acquisition (C/A) code, where the three copies of the received C/A code signal are an early code, a prompt code and a late code;

six code wipeoff correlators to determine a correlation between the in-phase signal, I, and each of the early code, the prompt code and the late code, and between the quadrature signal, Q, and each of the early code, the prompt code and the late code; and a noise-floor independent delay-lock loop discriminator to calculate a prompt correlation result, an early correlation result and a late correlation result using the six correlations calculated by the six code wipeoff correlators, wherein the discriminator determines a peak correlation result based on the early, the prompt and the late correlation results, and applies the peak correlation result to a discriminator function to cancel out a noise term in a numerator and a denominator of the discriminator function to generate a noise floor independent discriminator function to calculate a phase error as a spacing between the prompt correlation result and the peak correlation using a function of the prompt, early and late correlations independent of a noise floor estimate.

14. The system of claim 13 where the noise floor independent discriminator
calculates the phase error $\delta_{cp}$ using:

$$\delta_{cp} = d\frac{E-L}{2P+|E-L|-(E+L)}, \text{ where:}$$

d=the correlator spacing,
E=the early correlation result,
P=the prompt correlation result, and
L=the late correlation result.

15. The system of claim 13 where:
the early correlation result is determined by:
    determining an $I_E$ correlation of the in-phase signal, I, and the first copy of the received C/A code signal;
    determining a $Q_E$ correlation of the quadrature signal, Q, and the first copy of the received C/A code signal;
    integrating the $I_E$ correlation and the $Q_E$ correlation, each over a predetection integration interval to generate smooth early correlations $I_{ES}$, and $Q_{ES}$;
the prompt correlation result is determined by:
    determining an $I_P$ correlation of the in-phase signal, I, and the second copy of the received code C/A signal;
    determining a $Q_P$ correlation of the quadrature signal, Q, and the second copy of the received C/A code signal;
    integrating the $I_P$ correlation and the $Q_P$ correlation, each over a predetection integration interval to generate smooth prompt correlations $I_{PS}$, and $Q_{PS}$;
the late correlation result is determined by:
    determining an $I_L$ correlation of the in-phase signal, I, and the third copy of the received C/A code signal;
    determining a $Q_L$ correlation of the quadrature signal, Q, and the third copy of the received C/A code signal;
    integrating the $I_L$ correlation and the $Q_L$ correlation, each over a predetection integration interval to generate smooth late correlations $I_{LS}$, and $Q_{LS}$.

16. The system of claim 15 where:
the early correlation result is determined by:

$$E = \sum_{n=1}^{N_{nc}} \sqrt{I_{ES}^2(n) + Q_{ES}^2(n)}, \text{ where:}$$

E=the early correlation result,
$I_{ES}$=the smooth early correlation for the in-phase signal,
$Q_{ES}$=the smooth early correlation for the quadrature signal,
n=integration index;
the prompt correlation result is determined by:

$$P = \sum_{n=1}^{N_{nc}} \sqrt{I_{PS}^2(n) + Q_{PS}^2(n)}, \text{ where:}$$

P=the prompt correlation result,
$I_{PS}$=the smooth prompt correlation for the in-phase signal,
$Q_{PS}$=the smooth prompt correlation for the quadrature signal,
n=integration index;
the late correlation result is determined by:

$$L = \sum_{n=1}^{N_{nc}} \sqrt{I_{LS}^2(n) + Q_{LS}^2(n)}, \text{ where:}$$

L=the late correlation result,
$I_{LS}$=the smooth late correlation for the in-phase signal,
$Q_{LS}$=the smooth late correlation for the quadrature signal,
n=integration index.

17. A discriminator in a delay-locked loop function comprising:
at least one signal input for receiving an early correlation result from correlating a received code signal and an early code, the early code being a first copy of the received code signal that phase-leads the received code signal by one correlator spacing;
at least one signal input for receiving a prompt correlation result from correlating the received code signal with a prompt code, the prompt code being a second copy of the received code signal that lags the early code in phase by one correlator spacing;
at least one signal input for receiving a late correlation result from correlating the received code signal with a late code, the late code being a third copy of the received code signal that lags the prompt code in phase by one correlator spacing;
an auto-correlation function having a peak correlation based on the early, prompt and late correlation results; and
a phase error detector that determines a phase error using a discriminator function, the discriminator function having the peak correlation result applied to cancel out a noise term in a numerator and a denominator of the discriminator function to generate a noise floor independent discriminator function which calculates the phase error as a spacing between the prompt correlation result and the peak correlation using a function of the prompt, early and late correlations independent of a noise floor estimate.

18. The discriminator of claim 17 where the phase error detector calculates the phase error $\delta_{cp}$ using:

$$\delta_{cp} = d\frac{E-L}{2P+|E-L|-(E+L)}, \text{ where:}$$

d=the correlator spacing,
E=the early correlation result,
P=the prompt correlation result, and
L=the late correlation result.

19. The system of claim 18 where:
the received code signal includes an in-phase signal, I, and a quadrature signal, Q;
the early correlation result is determined by:
    determining an $I_E$ correlation of the in-phase signal, I, and the first copy of the received code signal;
    determining a $Q_E$ correlation of the quadrature signal, Q, and the first copy of the received code signal;
    integrating the $I_E$ correlation and the $Q_E$ correlation, each over a predetection integration interval to generate smooth early correlations $I_{ES}$, and $Q_{ES}$;
the prompt correlation result is determined by:
    determining an $I_P$ correlation of the in-phase signal, I, and the second copy of the received code signal;

determining a $Q_E$ correlation of the quadrature signal, Q, and the second copy of the received code signal;

integrating the $I_P$ correlation and the $Q_P$ correlation, each over a predetection integration interval to generate smooth prompt correlations $I_{PS}$, and $Q_{PS}$;

the late correlation result is determined by:
determining an $I_L$ correlation of the in-phase signal, I, and the third copy of the received code signal;
determining a $Q_L$ correlation of the quadrature signal, Q, and the third copy of the received code signal;
integrating the $I_L$ correlation and the $Q_L$ correlation, each over a predetection integration interval to generate smooth late correlations $I_{LS}$, and $Q_{LS}$.

20. The system of claim 19 where:
the early correlation result is determined by:

$$E = \sum_{n=1}^{N_{nc}} \sqrt{I_{ES}^2(n) + Q_{ES}^2(n)}, \text{ where:}$$

E=the early correlation result,
$I_{ES}$=the smooth early correlation for the in-phase signal,
$Q_{ES}$=the smooth early correlation for the quadrature signal,
n=integration index;

the prompt correlation result is determined by:

$$P = \sum_{n=1}^{N_{nc}} \sqrt{I_{PS}^2(n) + Q_{PS}^2(n)}, \text{ where:}$$

P=the prompt correlation result,
$I_{PS}$=the smooth prompt correlation for the in-phase signal,
$Q_{PS}$=the smooth prompt correlation for the quadrature signal,
n=integration index;

the late correlation result is determined by:

$$L = \sum_{n=1}^{N_{nc}} \sqrt{I_{LS}^2(n) + Q_{LS}^2(n)}, \text{ where:}$$

L=the late correlation result,
$I_{LS}$=the smooth late correlation for the in-phase signal,
$Q_{LS}$=the smooth late correlation for the quadrature signal,
n=integration index.

* * * * *